US011832269B2

(12) United States Patent
Ko et al.

(10) Patent No.: US 11,832,269 B2
(45) Date of Patent: Nov. 28, 2023

(54) METHOD AND APPARATUS FOR DETERMINING SIDELINK RESOURCE IN NR V2X

(71) Applicant: LG Electronics Inc., Seoul (KR)

(72) Inventors: Woosuk Ko, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 18 days.

(21) Appl. No.: 17/328,720

(22) Filed: May 24, 2021

(65) Prior Publication Data

US 2021/0368536 A1 Nov. 25, 2021

Related U.S. Application Data

(60) Provisional application No. 63/030,273, filed on May 26, 2020.

(30) Foreign Application Priority Data

May 22, 2020 (KR) .......................... 10-2020-0061845
Apr. 30, 2021 (KR) .......................... 10-2021-0056496

(51) Int. Cl.
*H04W 72/12* (2023.01)
*H04W 72/23* (2023.01)
(Continued)

(52) U.S. Cl.
CPC ............. *H04W 72/23* (2023.01); *H04W 4/40* (2018.02); *H04W 72/1263* (2013.01); *H04W 72/20* (2023.01)

(58) Field of Classification Search
None
See application file for complete search history.

(56) References Cited

U.S. PATENT DOCUMENTS

2016/0302249 A1* 10/2016 Sheng ...................... H04W 4/70
2020/0029318 A1* 1/2020 Guo ........................ H04L 1/1822
(Continued)

FOREIGN PATENT DOCUMENTS

WO WO-2019005920 A1 * 1/2019 ............... H04L 1/08
WO WO-2020030177 A1 * 2/2020 ........... H04L 5/0007
(Continued)

*Primary Examiner* — Kodzovi Acolatse
(74) *Attorney, Agent, or Firm* — Fish & Richardson P.C.

(57) ABSTRACT

Provided are a method for performing wireless communication by a first device, and an apparatus for supporting same. The method may comprise: receiving a radio resource control (RRC) message including information related to configured grant (CG) from a base station, wherein the information related to the CG include information for an offset related to the CG and information for a period related to the CG; based on at least one resource pool being configured for the first apparatus, performing sidelink transmission to a second apparatus based on sidelink resources determined from among candidate resources allocated by the CG in the at least one resource pool. For example, the sidelink resources determined from among the candidate resources allocated by the CG are located after the offset related to the CG from the closest sidelink slot after the time when the system frame number (SFN) is zero. For example, the sidelink resources from among the candidate resources allocated by the CG are repeated with the period related to the CG.

17 Claims, 20 Drawing Sheets

(51) Int. Cl.
    *H04W 4/40*        (2018.01)
    *H04W 72/1263*    (2023.01)
    *H04W 72/20*      (2023.01)

(56) References Cited

U.S. PATENT DOCUMENTS

| | | | | |
|---|---|---|---|---|
| 2020/0037314 A1* | 1/2020 | Xiong | | H04L 5/0091 |
| 2020/0128470 A1* | 4/2020 | Mok | | H04W 24/04 |
| 2020/0267729 A1* | 8/2020 | Kim | | H04W 72/0453 |
| 2020/0275425 A1* | 8/2020 | Cao | | H04W 4/44 |
| 2020/0344771 A1* | 10/2020 | Kang | | H04W 28/0268 |
| 2021/0014831 A1* | 1/2021 | Ryu | | H04W 72/0493 |
| 2021/0105787 A1* | 4/2021 | Park | | H04W 72/085 |
| 2021/0168862 A1* | 6/2021 | Murray | | H04W 74/0816 |
| 2021/0212027 A1* | 7/2021 | Wu | | H04W 72/04 |
| 2022/0046698 A1* | 2/2022 | Zhao | | H04W 72/14 |
| 2022/0060929 A1* | 2/2022 | Hassan | | H04W 72/085 |
| 2022/0116916 A1* | 4/2022 | Zhao | | H04W 72/0453 |
| 2022/0141866 A1* | 5/2022 | Liu | | H04L 5/0012 |
| | | | | 370/329 |
| 2022/0369360 A1* | 11/2022 | Zhao | | H04W 72/0446 |

FOREIGN PATENT DOCUMENTS

| | | | | |
|---|---|---|---|---|
| WO | WO-2020166922 A1 * | 8/2020 | ........... | H04L 1/1812 |
| WO | WO-2020220318 A1 * | 11/2020 | ........... | H04W 72/14 |

\* cited by examiner

METHOD AND APPARATUS FOR DETERMINING SIDELINK RESOURCE IN NR V2X

CROSS-REFERENCE TO RELATED APPLICATIONS

Pursuant to 35 U.S.C. § 119 (e), this application claims the benefit of Korean Patent Applications No. 10-2020-0061845 filed on May 22, 2020, No. 10-2021-0056496 filed on Apr. 30, 2021 and U.S. Provisional Application No. 63/030,273 filed on May 26, 2020, the contents of which are all hereby incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

Thereafter, regarding V2X communication, various V2X scenarios are proposed in NR. For example, the various V2X scenarios may include vehicle platooning, advanced driving, extended sensors, remote driving, or the like.

SUMMARY OF THE DISCLOSURE

Technical Objects

Meanwhile, in sidelink mode 1 transmission, for example, in the case of configured grant (CG) type-1, the base station allocates the CG type-1 resources to the UE, the UE may determine the CG resources based on the DL system frame number (SFN)=0 timing. However, for example, if the plurality of available transmission resource pools are configured for the UE, when the UE determines the earliest SL resources based on DL SFN=0 to determine the CG resource, it may be unclear which transmission resource pool the earliest SL resource is included in.

Technical Solutions

In one embodiment, provided is a method for performing wireless communication by a first device. The method may comprise: receiving a radio resource control (RRC) message including information related to configured grant (CG) from a base station, wherein the information related to the CG include information for an offset related to the CG and information for a period related to the CG; based on at least one resource pool being configured for the first apparatus, performing sidelink transmission to a second apparatus based on sidelink resources determined from among candidate resources allocated by the CG in the at least one resource pool. For example, the sidelink resources determined from among the candidate resources allocated by the CG are located after the offset related to the CG from the closest sidelink slot after the time when the system frame number (SFN) is zero. For example, the sidelink resources from among the candidate resources allocated by the CG are repeated with the period related to the CG.

In one embodiment, provided is a first apparatus configured to perform wireless communication. The first apparatus may comprise: one or more memories storing instructions; one or more transceivers; and one or more processors connected to the one or more memories and the one or more transceivers. The one or more processors may execute the instructions to: receive a radio resource control (RRC) message including information related to configured grant (CG) from a base station, wherein the information related to the CG include information for an offset related to the CG and information for a period related to the CG; based on at least one resource pool being configured for the first apparatus, perform sidelink transmission to a second apparatus based on sidelink resources determined from among candidate resources allocated by the CG in the at least one resource pool. For example, the sidelink resources determined from among the candidate resources allocated by the CG are located after the offset related to the CG from the closest sidelink slot after the time when the system frame number (SFN) is zero. For example, the sidelink resources from among the candidate resources allocated by the CG are repeated with the period related to the CG.

Effects of the Disclosure

The user equipment (UE) may efficiently perform relay reselection.

DESCRIPTION OF EXEMPLARY EMBODIMENTS

Figure 1:
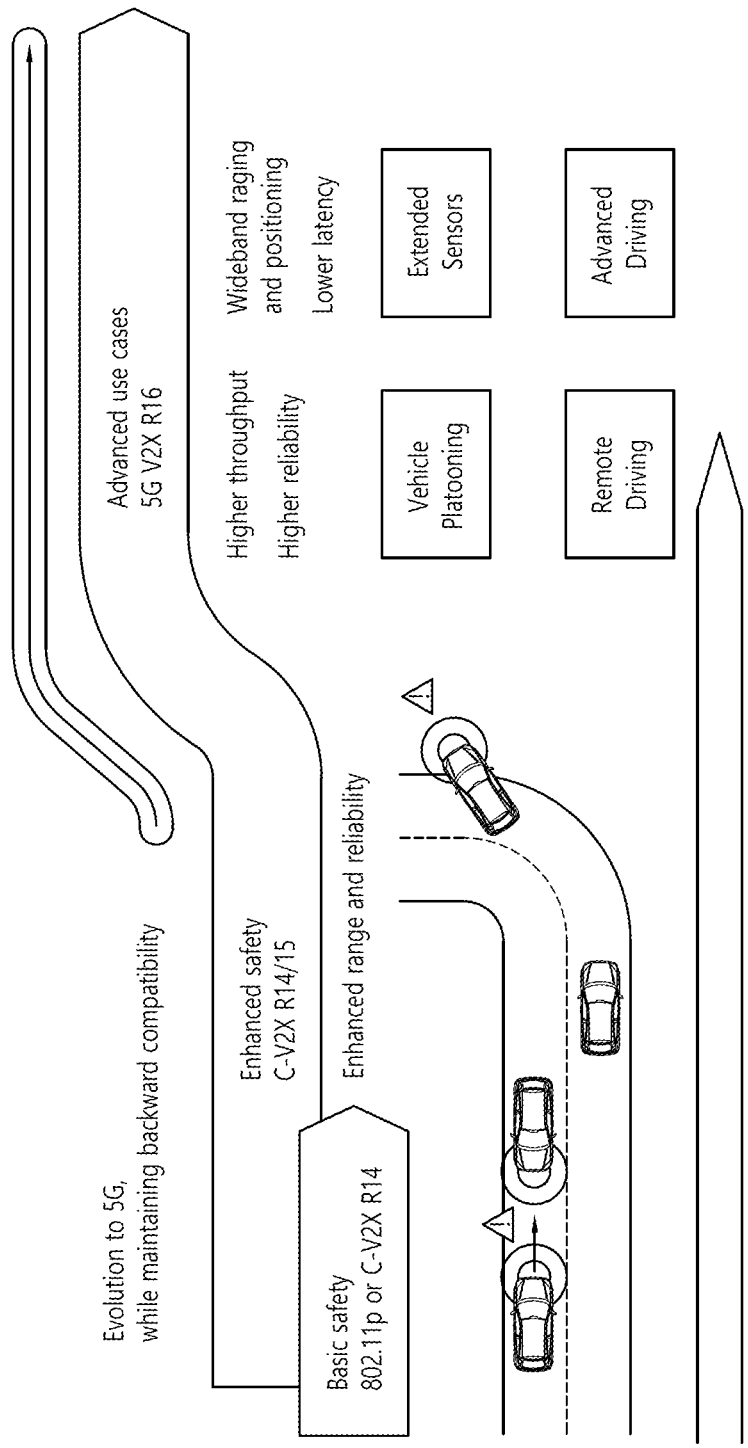
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
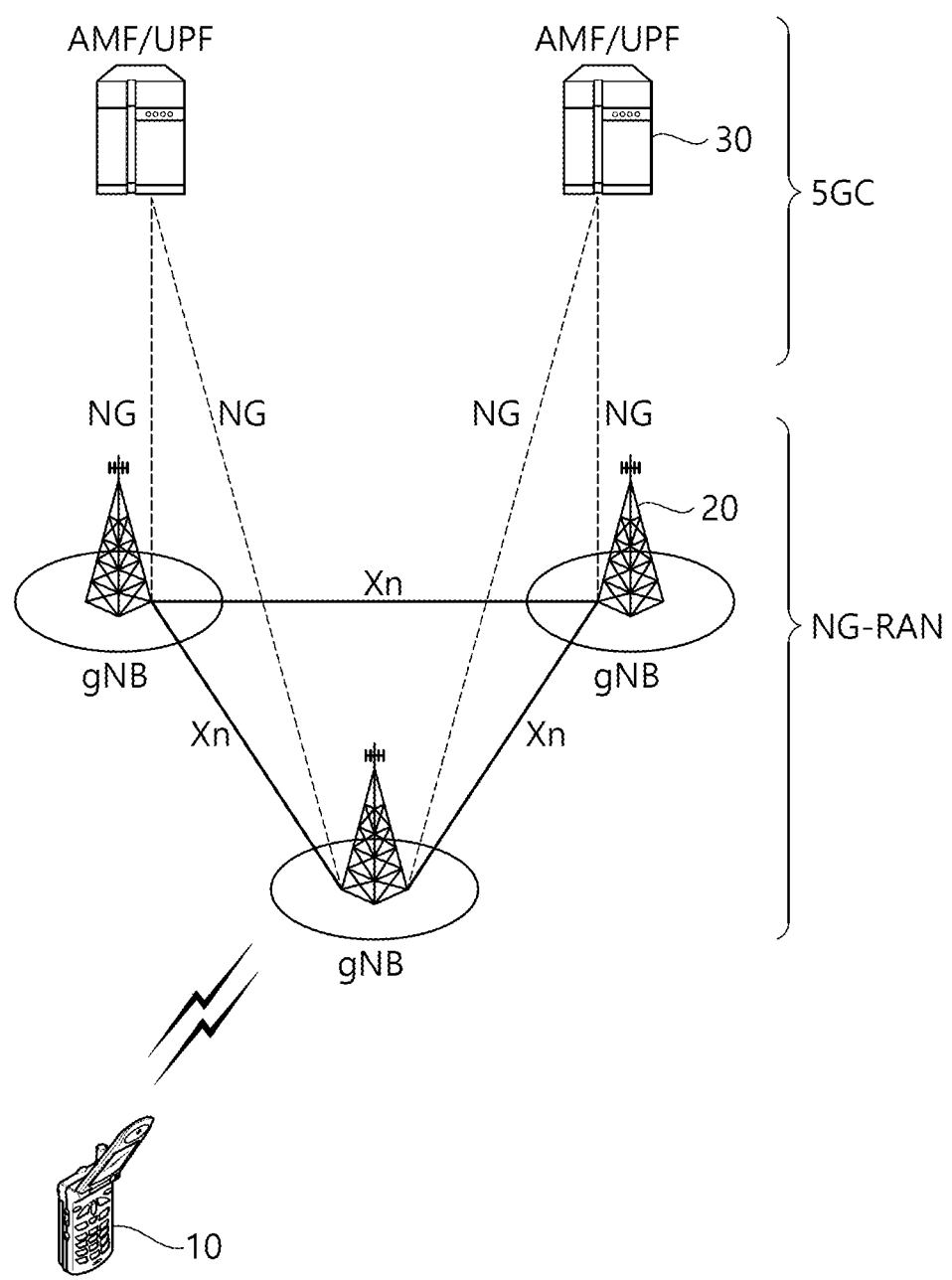
FIG. 2 shows a structure of an NR system, in accordance with an embodiment of the present disclosure.

FIG. 2 shows a structure of an NR system, in accordance with an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface. Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 3:
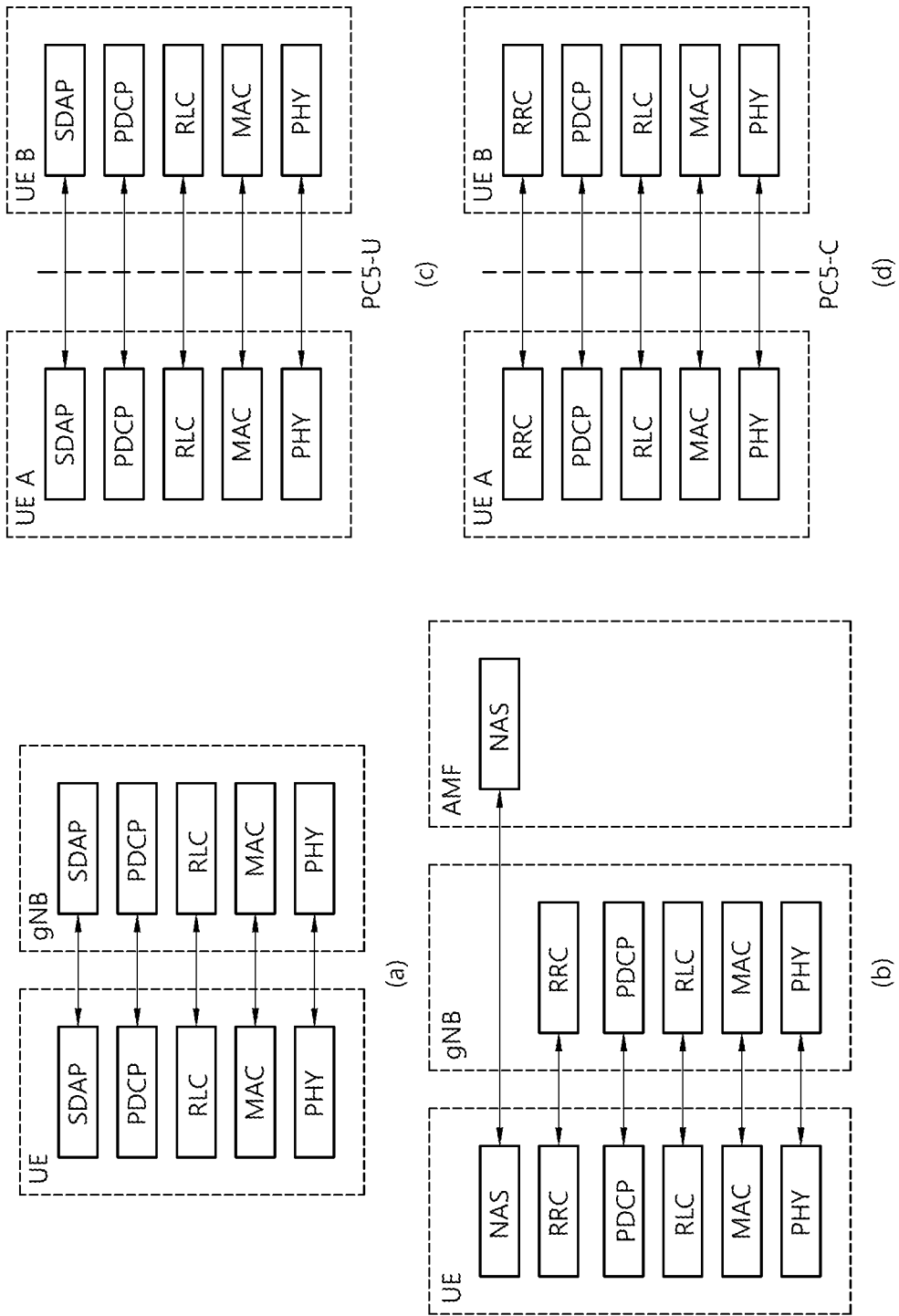
FIG. 3 shows a radio protocol architecture, in accordance with an embodiment of the present disclosure.

FIG. 3 shows a radio protocol architecture, in accordance with an embodiment of the present disclosure. The embodiment of FIG. 3 may be combined with various embodiments of the present disclosure. Specifically, (a) of FIG. 3 shows a radio protocol stack of a user plane for Uu communication, and (b) of FIG. 3 shows a radio protocol stack of a control plane for Uu communication. (c) of FIG. 3 shows a radio protocol stack of a user plane for SL communication, and (d) of FIG. 3 shows a radio protocol stack of a control plane for SL communication.

Referring to FIG. 3, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
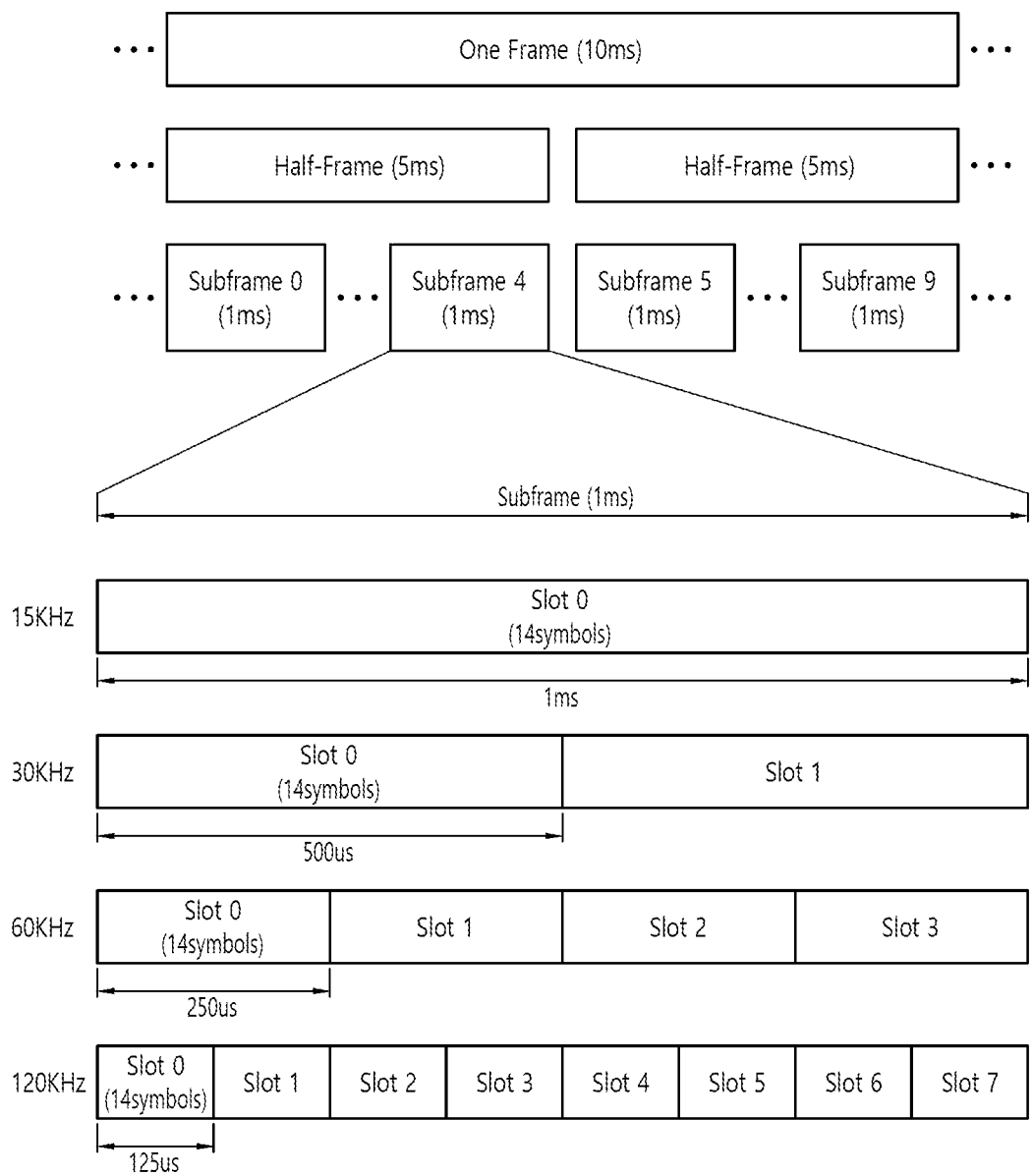
FIG. 4 shows a structure of a radio frame of an NR, in accordance with an embodiment of the present disclosure.

FIG. 4 shows a structure of a radio frame of an NR, in accordance with an embodiment of the present disclosure. The embodiment of FIG. 4 may be combined with various embodiments of the present disclosure.

Referring to FIG. 4, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$) a number slots per frame ($N^{frame,u}_{slot}$), and a number of slots per subframe ($N^{subframe,u}_{slot}$) in accordance with an SCS configuration (u), in a case where a normal CP is used.

TABLE 1

| SCS (15*2$^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS (15*2$^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
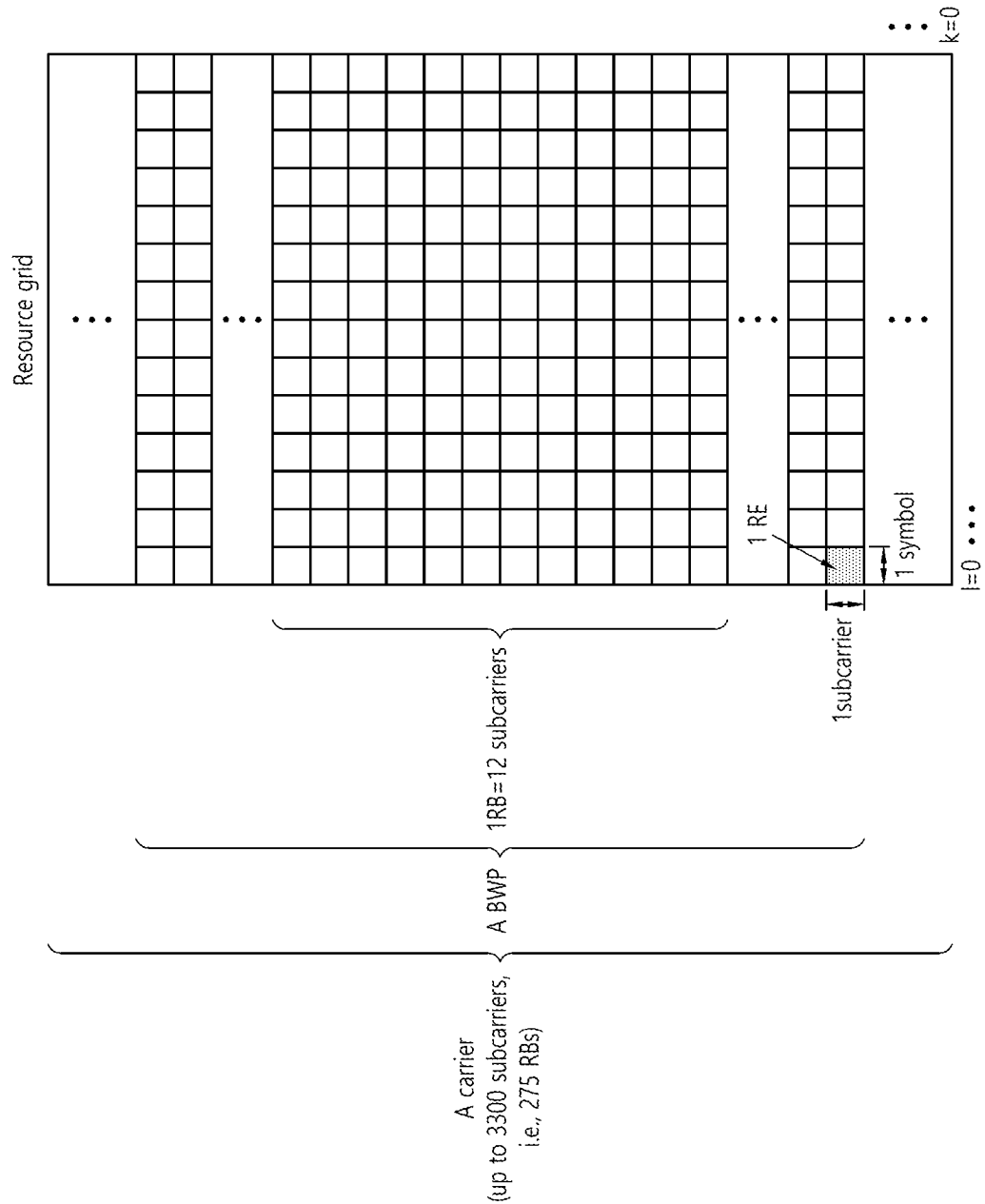
FIG. 5 shows a structure of a slot of an NR frame, in accordance with an embodiment of the present disclosure.

FIG. 5 shows a structure of a slot of an NR frame, in accordance with an embodiment of the present disclosure. The embodiment of FIG. 5 may be combined with various embodiments of the present disclosure.

Referring to FIG. 5, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORE-SET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 6:
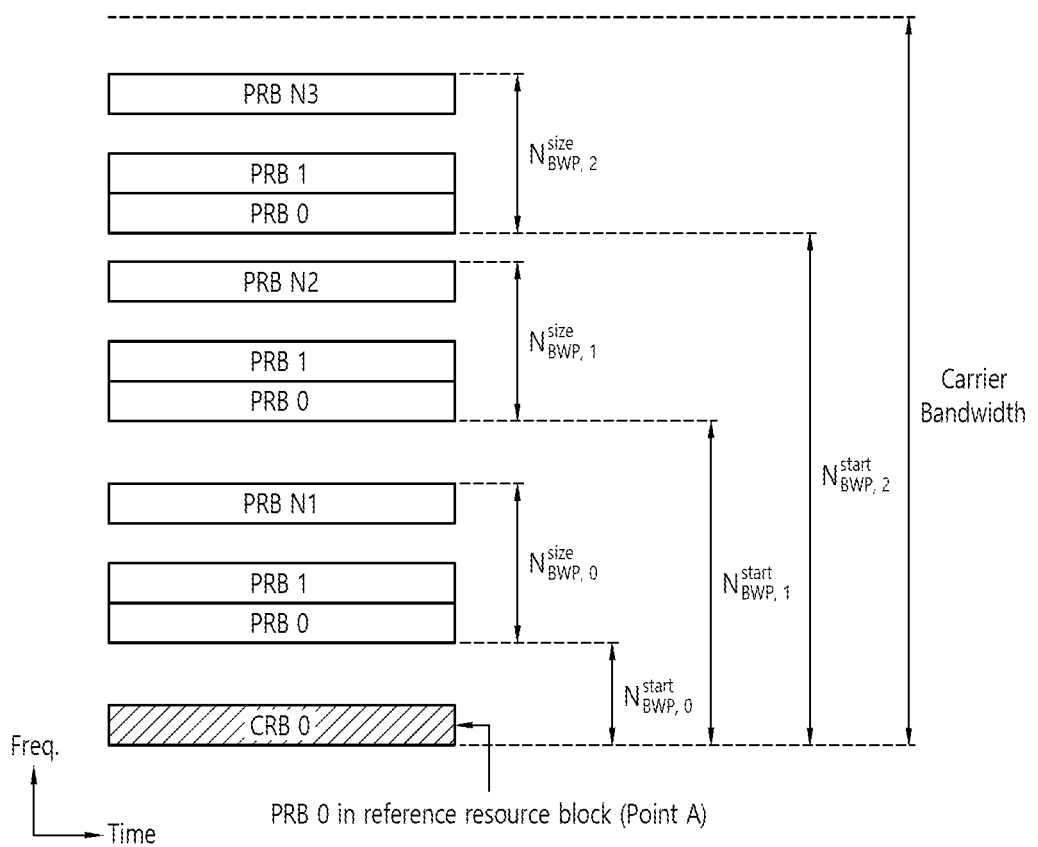
FIG. 6 shows an example of a BWP, in accordance with an embodiment of the present disclosure.

FIG. 6 shows an example of a BWP, in accordance with an embodiment of the present disclosure. The embodiment of FIG. 6 may be combined with various embodiments of the present disclosure. It is assumed in the embodiment of FIG. 6 that the number of BWPs is 3.

Referring to FIG. 6, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-) configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 7:
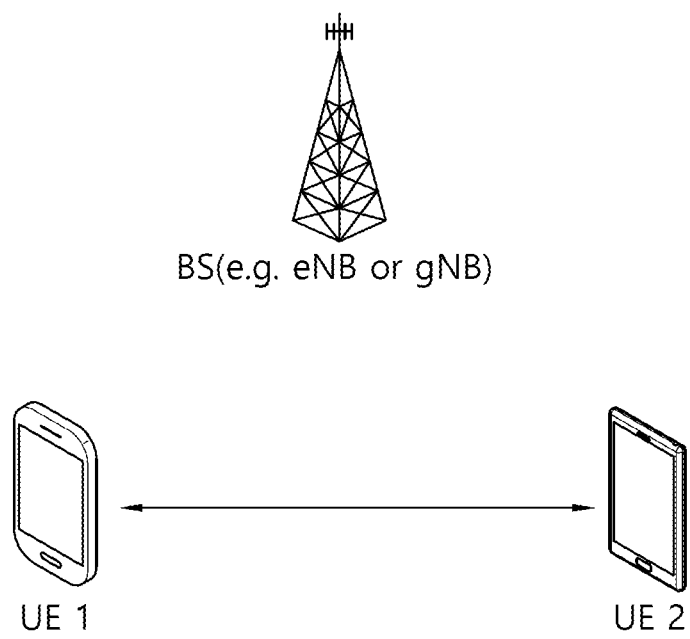
FIG. 7 shows a UE performing V2X or SL communication, in accordance with an embodiment of the present disclosure.

FIG. 7 shows a UE performing V2X or SL communication, in accordance with an embodiment of the present disclosure. The embodiment of FIG. 7 may be combined with various embodiments of the present disclosure.

Referring to FIG. 7, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 8:
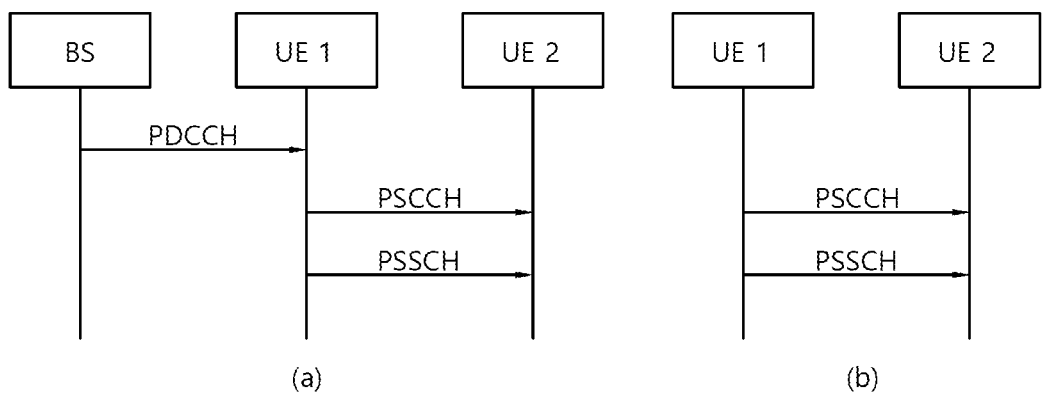
FIG. 8 shows a procedure of performing V2X or SL communication by a UE based on a transmission mode, in accordance with an embodiment of the present disclosure.

FIG. 8 shows a procedure of performing V2X or SL communication by a UE based on a transmission mode, in accordance with an embodiment of the present disclosure. The embodiment of FIG. 8 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 8 shows a UE operation related to an LTE transmission mode 1 or an LTE transmission mode 3. Alternatively, for example, (a) of FIG. 8 shows a UE operation related to an NR resource allocation mode 1. For example, the LTE transmission mode 1 may be applied to general SL communication, and the LTE transmission mode 3 may be applied to V2X communication.

For example, (b) of FIG. 8 shows a UE operation related to an LTE transmission mode 2 or an LTE transmission mode 4. Alternatively, for example, (b) of FIG. 8 shows a UE operation related to an NR resource allocation mode 2.

Referring to (a) of FIG. 8, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (e.g., downlink control information (DCI)) or RRC signaling (e.g., Configured Grant Type 1 or Configured Grant Type 2), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to (b) of FIG. 8, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 9:
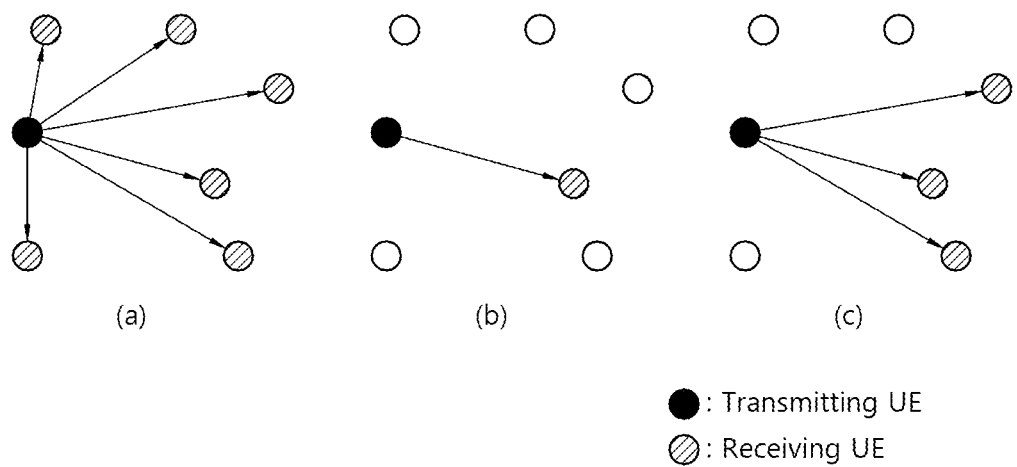
FIG. 9 shows three cast types, in accordance with an embodiment of the present disclosure.

FIG. 9 shows three cast types, in accordance with an embodiment of the present disclosure. The embodiment of FIG. 9 may be combined with various embodiments of the present disclosure. Specifically, FIG. 9(a) shows broadcast-type SL communication, FIG. 9(b) shows unicast type-SL communication, and FIG. 9(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in mode 1 operation of sidelink communication, the base station may schedule SL resources to be used by the UE for SL transmission. For example, the UE may be allocated PSCCH resources, PSSCH resources, PSFCH resources, and PUCCH resources by the base station. The PUCCH resources may be the resources for reporting HARQ feedback to the base station. In addition, for example, the base station may inform the UE of the timing and location for the above-described SL resources (e.g., PSCCH resources, PSSCH resources, PSFCH resources, and PUCCH resources related to SL communication) based on SL DCI. For example, the SL DCI may include timing information and location information for the PSCCH resources, the PSSCH resources, the PSFCH resources, and the PUCCH resources related to SL communication.

For example, the method in which the base station allocates resources to the UE may include a method of using a dynamic grant (DG) in which the base station directly dynamically allocates resources to the UE, a method using CG type-1 in which the base station allocates periodic resources to the UE through higher layer signaling (e.g., RRC) and a method of using CG type-2 to dynamically activate/deactivate the periodic resources through DCI after the base station allocates a periodic resource to the terminal through higher layer signaling (e.g., RRC).

For example, in the case of the DG or the CG type-2, when the base station allocates the DG resources or the CG type-2 resources to the UE, the UE may determine the DG resources or the CG type-2 resource based on the timing related to the DCI for configuring the allocated resources Alternatively, for example, in the case of CG type-1, when the base station allocates the CG type-1 resources to the UE, the UE may determine the CG resources based on the DL system frame number (SFN)=0 timing. However, for example, when a plurality of available transmission resource pools (TX resource pools) are configured for the UE, and the UE determines the earliest SL resources in time based on the timing at which DCI is received to determine the DG resources, it is unclear which transmission resource pool the earliest SL resources is included in, ambiguity in the determination of the DG resource may exist. Alternatively, for example, if the plurality of available transmission resource pools are configured for the UE, when the UE determines the earliest SL resources based on DL SFN=0 to determine the CG resource, it may be unclear which transmission resource pool the earliest SL resource is included in. That is, for example, when the plurality of available transmission resource pools are configured for the UE, and the base station does not indicate or signal the resource pools configured for the UE, it may be unclear for which transmission resource pool the UE will use the SL resource.

The present disclosure relates to a method of resolving ambiguity in determining SL resources when the base station allocates the SL resources to the UE through DG or CG in a state where a plurality of transmission resource pools are configured for the UE. For example, the base station may configure a plurality of transmission resource pools to the UE. Alternatively, for example, the plurality of transmission resource pools may be pre-configured for the UE. For example, in a state where the plurality of transmission resource pools are configured for the UE, when the base station allocates the SL resources to the UE through the DG or the CG, the UE may determine the SL resources according to various embodiments of the present disclosure. For example, the CG resources may include SL resources allocated by the CG. For example, the DG resources may include SL resources allocated by the DG.

According to an embodiment of the present disclosure, the base station may configure a sidelink transmission resource pool (SL TX resource pool) or a resource pool index to the UE through higher layer signaling (e.g., RRC). For example, the resource pool index may be an index of a configured resource pool. For example, the base station may pre-configure a sidelink transmission resource pool (SL TX resource pool) or a resource pool index to the UE through higher layer signaling (e.g., RRC). For example, the sidelink transmission resource pool or the resource pool index may be a resource pool or index of a resource pool including SL resources allocated to the UE through DG/CG.

According to an embodiment of the present disclosure, the base station may signal a sidelink transmission resource pool or an index of the resource pool to the UE through MAC CE or DCI. For example, the DCI may be a DCI related to SL resources allocated to the UE through DG/CG. For example, the sidelink transmission resource pool or the resource pool index may be a resource pool or an index of a resource pool including SL resources allocated to the UE through DG/CG.

According to an embodiment of the present disclosure, for example, a sidelink transmission resource pool including SL resources allocated to the UE through DG/CG among a plurality of transmission resource pools may be automatically determined. For example, the UE may automatically determine a sidelink transmission resource pool from among a plurality of transmission resource pools, and the UE may determine SL resources allocated by CG/DG in the sidelink transmission resource pool.

According to an embodiment of the present disclosure, the UE may determine the SL resources allocated by the CG/DG by using a resource pool having the largest index of the resource pool among a plurality of transmission resource pools. For example, the UE may select a resource pool having the largest index of the resource pool from among a plurality of transmission resource pools. Alternatively, for example, the UE may select a resource pool having the smallest index of the resource pool from among a plurality of transmission resource pools. For example, the UE may determine the SL resources allocated by the CG/DG in the selected resource pool.

According to an embodiment of the present disclosure, the base station may configure any one resource pool from among a plurality of transmission resource pools to the UE through higher layer signaling (e.g., RRC). For example, the UE may determine SL resources allocated through CG/DG in the configured resource pool. Alternatively, for example, any one of a plurality of transmission resource pools may be pre-configured to the UE through higher layer signaling (e.g., RRC), and the UE may determine SL resources allocated through CG/DG in the pre-configured resource pool. For example, the base station may signal any one resource pool from among a plurality of transmission resource pools to the UE through MAC CE or DCI, the UE may determine SL resources allocated through CG/DG in the signaled resource pool.

According to an embodiment of the present disclosure, the UE may determine SL resources allocated by the CG/DG, by using a resource pool having the highest channel occupancy ratio (CR) among a plurality of transmission resource pools. For example, the UE may select a resource pool having the highest CR among a plurality of transmission resource pools. Alternatively, for example, the UE may select a resource pool having the lowest CR among a plurality of transmission resource pools. For example, the UE may determine SL resources allocated by the CG/DG in the selected resource pool. Herein, for example, CR may be a ratio occupied by the SL resources used by the UE to total resources of a transmission resource pool. Herein, for example, the resource pool having the highest CR may be a transport channel previously used by the UE. Alternatively, for example, the UE may select a resource pool having the lowest CR, thereby increasing the SL resource usage efficiency.

According to an embodiment of the present disclosure, the UE may determine SL resources allocated by the CG/DG, by using a resource pool having the lowest channel busy ratio (CBR) among a plurality of transmission resource pools. For example, the UE may select a resource pool having the lowest CBR among a plurality of transmission resource pools. For example, the UE may determine the SL resources allocated by the CG/DG in the selected resource pool. Herein, for example, CBR may be a ratio of SL resources used by other UEs to total resources of a transmission resource pool. For example, by using the resource pool having the lowest CBR, the UE may increase the efficiency of using the SL transmission resource and the transmission success probability.

According to an embodiment of the present disclosure, the UE may randomly select any one resource pool from among a plurality of transmission resource pools, and the UE may determine SL resources allocated by the CG/DG.

According to an embodiment of the present disclosure, the UE may select any one resource pool from among a plurality of transmission resource pools based on a geographic location (e.g., a zone) in which the UE is located, and the UE may determine SL resources allocated by the CG/DG. For example, the UE may select a resource pool capable of minimizing interference to transmission between the UEs among a plurality of transmission resource pools based on the geographic location in which the UE is located.

According to an embodiment of the present disclosure, the UE may measure DL RSRP between the base station and the UE, and the UE may select any one resource pool from among a plurality of transmission resource pools according to the measured DL RSRP. For example, the UE may determine SL resources allocated by the CG/DG in the selected resource pool. For example, the UE may select a resource pool in which the DL RSRP measured by the UE is within a range related to the DL RSRP among a plurality of transmission resource pools. In this case, for example, the range related to the DL RSRP may be pre-configured or configured to the UE through higher layer signaling (e.g., RRC). For example, the range related to the DL RSRP may be dynamically signaled to the UE through MAC CE or DCI. Therefore, the UE can minimize interference on the Uu link between the base station and the UE.

According to an embodiment of the present disclosure, the UE may measure SL RSRP between the UEs, and the UE may select any one resource pool from among a plurality of transmission resource pools according to the measured SL RSRP. For example, the UE may determine SL resources allocated by the CG/DG in the selected resource pool. For example, the UE may select a resource pool in which the SL RSRP measured by the UE is within a range related to the SL RSRP among a plurality of transmission resource pools. In this case, for example, the range related to the SL RSRP may be pre-configured or configured to the UE through higher layer signaling (e.g., RRC). For example, the range related to the SL RSRP may be dynamically signaled to the UE through MAC CE or DCI. Therefore, the UE can minimize interference with unicast transmission between the UEs.

According to an embodiment of the present disclosure, when SL resources are allocated to the UE by the DG or the CG Type-2, the UE may select a resource pool including the earliest sidelink slot from the time when the UE receives the DCI related to the SL resource from the base station, among a plurality of transmission resource pools. For example, the UE may determine the SL resources allocated by the CG/DG in the selected resource pool. For example, a unit of the sidelink slot may be a logical sidelink slot unit.

According to an embodiment of the present disclosure, when SL resources are allocated to the UE by the CG Type-1, the UE may select a resource pool including the earliest sidelink slot from the time when DL SFN=0, among a plurality of transmission resource pools. For example, when the SL resources are allocated to the UE by the CG Type-1, the UE may select a resource pool including the earliest sidelink slot from the time when SL SFN=0, among a plurality of transmission resource pools. For example, when the SL resources are allocated to the UE by the CG Type-1, the UE may select a resource pool including the earliest sidelink slot from a reference time to which an offset related to the CG Type 1 is applied, among a plurality of transmission resource pools. For example, the UE may determine the SL resources allocated by the CG in the selected resource pool. For example, the UE may determine the SL resources located after the offset related to the CG Type-1 from the closest sidelink slot after the time when the DL SFN is 0, as the SL resources allocated by the CG. That is, for example, the SL resources allocated by the CG may be located after the offset related to the CG Type-1 from the closest sidelink slot after the time when the DL SFN is 0. Herein, for example, a logical sidelink slot unit may be applied to the closest sidelink slot or the offset related to the CG Type-1. That is, for example, the UE may determine the closest sidelink slot or the offset related to CG Type-1 according to the logical sidelink slot unit. For example, the UE may select a resource pool including a sidelink slot having the largest offset related to the CG type-1. For example, the UE may select a resource pool including a sidelink slot having the smallest offset related to the CG type-1.

For example, a physical slot unit may be an absolute time unit. For example, the physical slot may include a slot related to an uplink, a slot related to a downlink, and a slot related to a sidelink. In addition, the logical slot unit may be a time unit based on sidelink slots. For example, the logical slot may include only sidelink slots. For example, the closest logical sidelink slot may be a point in time when the offset related to the CG is 0.

According to an embodiment of the present disclosure, when SL resources are allocated to the UE by the CG Type-1, the UE may selects a resource pool having the largest number of physical slots corresponding to logical sidelink slots among a plurality of transmission resource pools, and the UE may determine the SL resource allocated by the CG resource in the selected resource pool. For example, the physical slots may be configured by the base station to the UE based on physical timing, a physical slot or a physical symbol. For example, in the case of SL resources allocated by the CG, the UE may select a resource pool having the largest number of logical sidelink slots among physical slots configured by the base station based on physical timing, among a plurality of transmission resource pools.

According to an embodiment of the present disclosure, when the base station configures the CG resource through higher layer signaling (e.g., RRC) to the UE, the UE may determine the earliest complete logical sidelink slot from the time when DL SFN=0 among logical sidelink slots as a reference slot. For example, the logical sidelink slots are included in the resource pool (S) corresponding to the union of a plurality of resource pools configured for the UE. For example, the UE may determine/select a resource pool including the reference slot as a target resource pool (T) to which the CG resource is to be applied. For example, the UE may determine, as the first CG resource, the earliest logical sidelink slot after the point in time when a CG offset configured based on unit of logical sidelink slots included in the target resource pool (T) is applied. That is, for example, the target resource pool may include the earliest logical sidelink slot. For example, the earliest logical sidelink slot may be located after the point in time when a CG offset configured based on a unit of the logical sidelink slots. For example, the resource pool may include a sidelink resource pool. For example, the complete sidelink slot may be the entire sidelink slot, not a part of the sidelink slot.

According to an embodiment of the present disclosure, when the base station configures the CG resource through higher layer signaling (e.g., RRC) to the UE, the UE may determine the earliest complete logical sidelink slot from the time when DL SFN=0 among logical sidelink slots as a reference time. For example, the logical sidelink slots are included in the resource pool (S) corresponding to the union of a plurality of resource pools configured for the UE. For example, the UE may determine, as the reference slot, the earliest logical sidelink slot after the point in time when a CG offset configured based on unit of logical sidelink slots included in the resource pool (S) is applied from the reference time. For example, the UE may determine/select a resource pool including the reference slot among a plurality of resource pools (e.g., the resource pool (S)) as the target resource pool (T). For example, the UE may determine the reference slot as the first CG resource.

According to an embodiment of the present disclosure, when the base station configures the CG resource through higher layer signaling (e.g., RRC) to the UE, the UE may be configured a target resource pool from among a plurality of resource pools configured for the UE through the higher layer signaling (e.g., RRC). For example, the UE may determine, as a reference time, the earliest complete logical sidelink slot from the time when DL SFN=0, among sidelink resources in the target resource pool. For example, the UE may determine, as the first CG resource, the earliest logical sidelink slot after the point in time when a CG offset configured based on unit of logical sidelink slots in the target resource pool is applied from the reference time. For example, the target resource pool may be a resource pool to which the UE applies information related to the CG. For example, the target resource pool may be a resource pool in which the UE determines the earliest SL resource from SFN=0 based on information related to the CG.

According to an embodiment of the present disclosure, the base station may configure a timing offset (hereinafter, N_TA_OFFSET) value to the UE through higher layer signaling. Alternatively, for example, the N_TA_OFFSET value may be pre-configure for the UE through higher layer signaling. Alternatively, for example, the base station may signal the N_TA_OFFSET value to the UE through MAC CE or DCI. Therefore, it is possible to alleviate the case where the overlap between the sidelink transmission and the uplink transmission according to the DL timing exceeds one sidelink symbol, and the base station can adjust the timing of the interference that the sidelink transmission affects the uplink communication.

For example, the N_TA_OFFSET value may be configured differently for Uu communication (e.g., uplink communication) and sidelink communication. Herein, for example, when the UE performing sidelink communication is in an in-coverage state, the N_TA_OFFSET value may be configured differently for Uu communication (e.g., uplink communication) and the sidelink communication. For example, when the UE performing sidelink communication has a serving cell, the N_TA_OFFSET value may be configured differently for Uu communication (e.g., uplink communication) and the sidelink communication. For example, when sidelink communication is performed on a shared carrier, the N_TA_OFFSET value may be configured differently for Uu communication (e.g., uplink communication) and the sidelink communication. Herein, for example, the shared carrier may be a shared carrier between the Uu communication and the sidelink communication. For example, when sidelink communication is performed on an ITS-dedicated carrier, the N_TA_OFFSET value may be configured differently for Uu communication (e.g., uplink communication) and the sidelink communication. For example, when sidelink communication is performed on a TDD carrier, the N_TA_OFFSET value may be configured differently for Uu communication (e.g., uplink communication) and the sidelink communication. For example, when sidelink communication is performed on an FDD carrier, the N_TA_OFFSET value may be configured differently for Uu communication (e.g., uplink communication) and sidelink communication.

In the present disclosure, when a plurality of transmission resource pools are configured for the UE, a method for the UE to determine the resource pool to determine the sidelink resources that the base station configures for the UE has been proposed. For example, according to various embodiments of the present disclosure, when the base station configures a plurality of sidelink transmission resource pools for the UE, in order to determine the sidelink resources that the base station configures for the UE, the UE may determine a sidelink transmission resource pool. For example, according to various embodiments of the present disclosure, when sidelink transmission resource pools do not overlap each other, it may be determined as a sidelink transmission resource pool to which the resource configured by the base station belongs. For example, according to various embodiments of the present disclosure, when sidelink transmission resource pools overlap each other, the UE may select a sidelink transmission resource pool.

Figure 10:
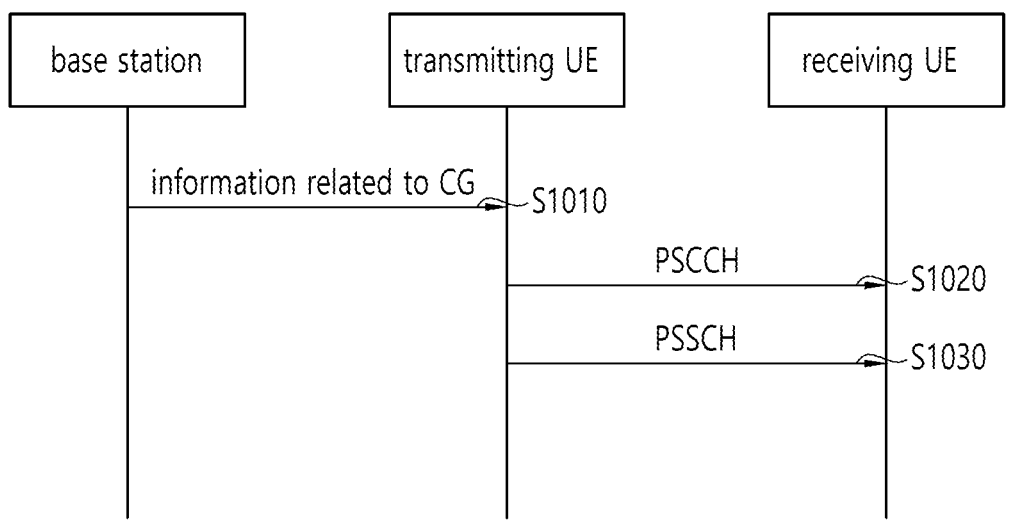
FIG. 10 shows a procedure for a transmitting UE to perform sidelink transmission based on information related to CG, in accordance with an embodiment of the present disclosure.
Figure 11:
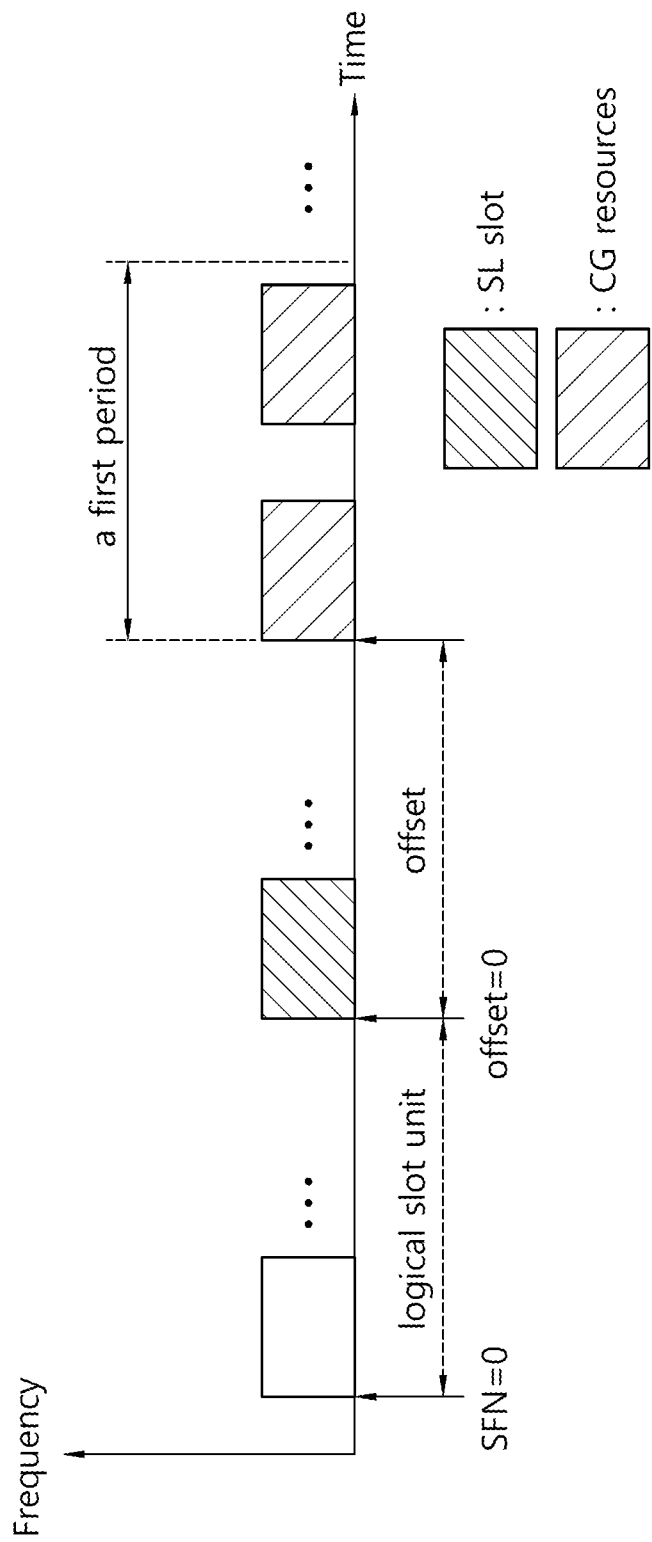
FIG. 11 shows an example of a period related to CG and an offset related to CG, in accordance with an embodiment of the present disclosure.
Figure 12:
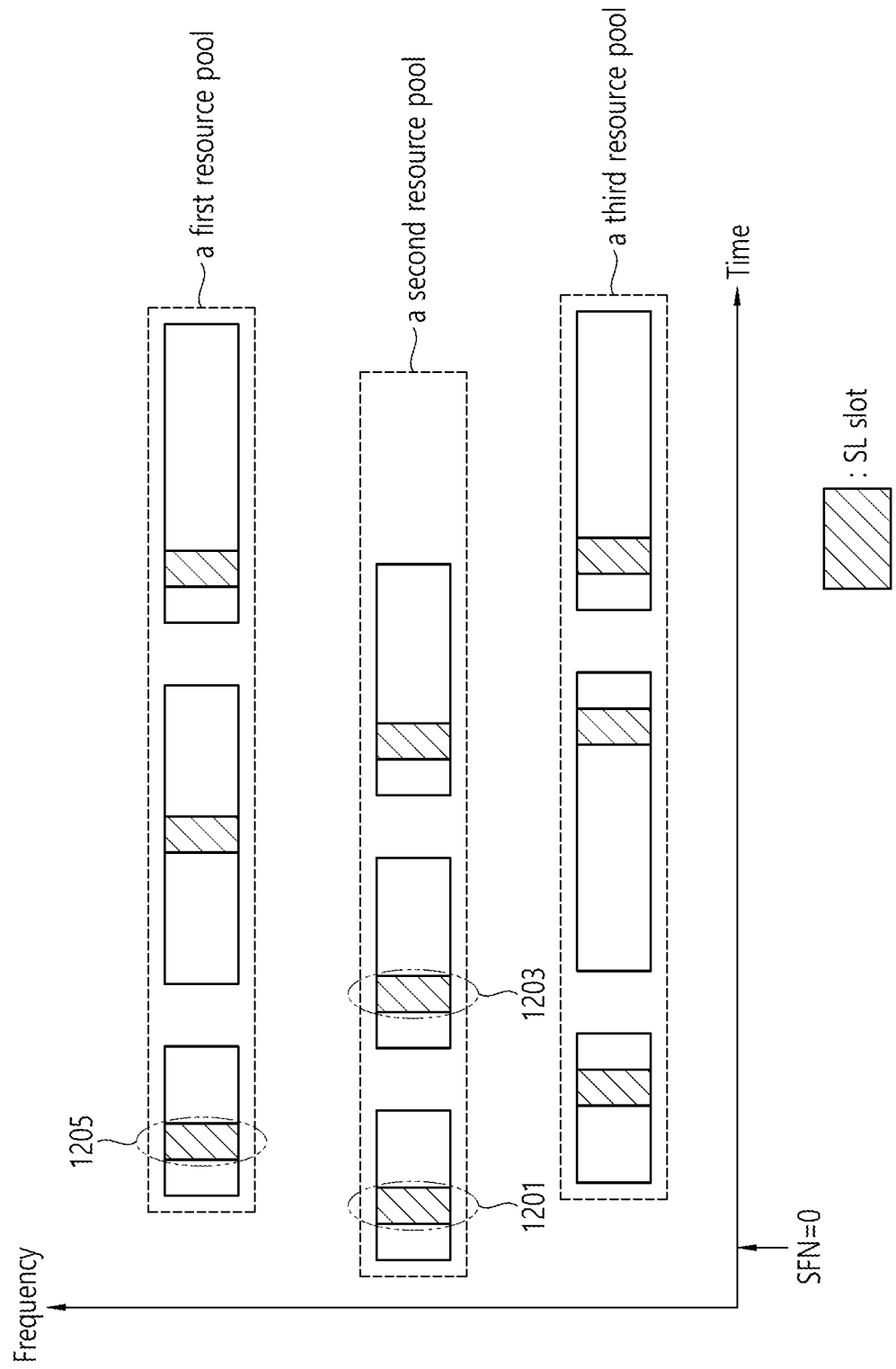
FIG. 12 shows an example of sidelink slots included in a plurality of resource pools, in accordance with an embodiment of the present disclosure.

FIG. 10 shows a procedure for a transmitting UE to perform sidelink transmission based on information related to CG, in accordance with an embodiment of the present disclosure. FIG. 11 shows an example of a period related to CG and an offset related to CG, in accordance with an embodiment of the present disclosure. FIG. 12 shows an example of sidelink slots included in a plurality of resource pools, in accordance with an embodiment of the present disclosure. The embodiments of FIG. 10 to FIG. 12 may be combined with various embodiments of the present disclosure.

Referring to FIG. 10, in step S1010, the base station may transmit information related to CG to the transmitting UE. For example, the base station may transmit an RRC message including information related to CG to the transmitting UE. For example, the information related to the CG may be information for scheduling sidelink resources. For example, the information related to the CG may include information for an offset related to the CG and information for a period related to the CG. Herein, for example, the offset related to the CG may be referred to as the CG offset. For example, the period related to the CG may be referred to as the CG period.

In step S1020, the transmitting UE may transmit a PSCCH to the receiving UE based on sidelink resources determined from among candidate resources allocated by the CG in at least one resource pool, based on that the at least one resource pool is configured for the transmitting UE. In step S1030, the transmitting UE may transmit a PSSCH to the receiving UE based on sidelink resources determined from among the candidate resources allocated by the CG in the at least one resource pool, based on that the at least one resource pool is configured for the transmitting UE. For example, the transmitting UE may perform sidelink transmission to the receiving UE based on a sidelink resources determined from among the candidate resources allocated by the CG in the at least one resource pool, based on that the at least one resource pool is configured for the transmitting UE. For example, the sidelink transmission may include transmitting a PSCCH or a PSSCH. For example, the sidelink resources determined from among the candidate resources allocated by the CG may be located after the offset related to the CG from the closest sidelink slot after the time when the system frame number (SFN) is 0. For example, the sidelink resources determined from among the candidate resources allocated by the CG may be located after the offset related to the CG from the closest logical sidelink slot after the time when the SFN is 0. For example, the sidelink resources determined from among the candidate resources allocated by the CG may be repeated with the period related to the CG. For example, the period related to the CG and the offset related to the CG may be in units of logical sidelink slots. For example, the logical sidelink slots may be resources in a sidelink resource pool.

Referring to FIG. 11, the sidelink resources determined from among the candidate resources allocated by the CG may be referred to as CG resources. For example, the time when the offset is 0 may correspond to the closest logical sidelink slot after the time when the SFN is 0. For example, the CG resources may be located after the offset from the time when the offset is 0. For example, the CG resources may be sidelink resources included in a first period related to the CG. For example, the offset value and the first period value may be in units of logical sidelink slots. For example, the CG resources may be located after the offset from the closest logical sidelink slot after the time when the SFN is 0.

For example, a physical slot unit may be an absolute time unit. For example, the physical slot may include a slot related to an uplink, a slot related to a downlink, and a slot related to a sidelink. In addition, the logical slot unit may be a time unit based on sidelink slots. For example, the logical slot may include only sidelink slots. For example, the closest logical sidelink slot may be a point in time when the offset related to the CG is 0.

For example, the transmitting UE may select a resource pool including the closest sidelink slot after the time when SFN is 0 among at least one resource pool, based on information related to the CG not including an index for a configured resource pool. Herein, for example, the closest sidelink slot after the time when the SFN is 0 may be a logical sidelink slot. For example, the offset related to the CG may be a unit of logical sidelink slots included in the resource pool. For example the offset related to the CG may be applied in the unit of logical sidelink slots included in the resource pool.

For example, based on the information related to the CG not including an index for a configured resource pool, the transmitting UE may select a resource pool having the lowest channel occupancy ratio (CR) among the at least one resource pool.

For example, based on the information related to the CG not including an index for a configured resource pool, the transmitting UE may select a resource pool having the lowest channel busy ratio (CBR) among the at least one resource pool.

For example, based on the information related to the CG not including an index for a configured resource pool, the transmitting UE may randomly select a resource pool from among the at least one resource pool.

For example, based on the information related to the CG not including an index for a configured resource pool, the transmitting UE may select a resource pool having the least interference to other UEs among the at least one resource pool based on a geographical location of the transmitting UE.

For example, based on the information related to the CG not including an index for a configured resource pool, the transmitting UE may select a resource pool in which DL RSRP measured by the transmitting UE is within a range related to the DL RSRP among at least one resource pool. For example, the range related to the DL RSRP may be pre-configured by higher layer signaling. Alternatively, for example, the range related to the DL RSRP may be signaled through MAC CE or DCI.

For example, based on the information related to the CG not including an index for a configured resource pool, the transmitting UE may select a resource pool in which SL RSRP measured by the transmitting UE is within a range related to the SL RSRP among at least one resource pool. For example, the range related to the SL RSRP range may be pre-configured by higher layer signaling. Alternatively, for example, the range related to the SL RSRP may be signaled through MAC CE or DCI.

For example, based on the information related to the CG not including an index for a configured resource pool, the transmitting UE may determine the closest logical sidelink slot after the time when SFN is 0 among at least one resource pool as a reference time. For example, the transmitting UE may select a resource pool including the closest logical sidelink slot after the offset related to the CG from the reference time. For example, the offset related to the CG may be a unit of logical sidelink slots included in all of the at least one resource pool. For example, the offset related to the CG may be applied in unit of logical sidelink slots included in all of the at least one resource pool.

For example, based on the information related to the CG including an index for a configured resource pool, the sidelink resources determined from among the candidate resources allocated by the CG may be located in the closest logical sidelink slot after the offset related to the CG from the closest logical sidelink slot after the time when SFN=0 among resources in the configured pool. For example, the offset related to the CG may be a unit of logical sidelink slots included in the configured resource pool. For example, the offset related to the CG may be applied in unit of logical sidelink slots included in the configured resource pool.

Referring to FIG. 12, the transmitting UE may be configured with a plurality of resource pools (e.g., sidelink transmission resource pools). For example, the plurality of resource pools may include a first resource pool, a second resource pool, and a third resource pool. For example, the transmitting UE may determine the closest logical sidelink slot 1201 after the time when the SFN is 0 as the reference time. According to an embodiment, the transmitting UE may select the second resource pool including the reference time 1201 among the plurality of resource pools. For example, the transmitting UE may determine, as the first CG resource, the closest logical sidelink slot 1203 after the offset related to the CG configured in unit of logical sidelink slots included in the second resource pool from the reference time 1201. According to another embodiment, the transmitting UE may select the first resource pool including the closest logical sidelink slot 1205 after the offset related to the CG configured in unit of logical sidelink slots included in all of the plurality of resource pools from the reference time 1201. For example, the transmitting UE may determine the logical sidelink slot 1205 as the first CG resource.

Figure 13:
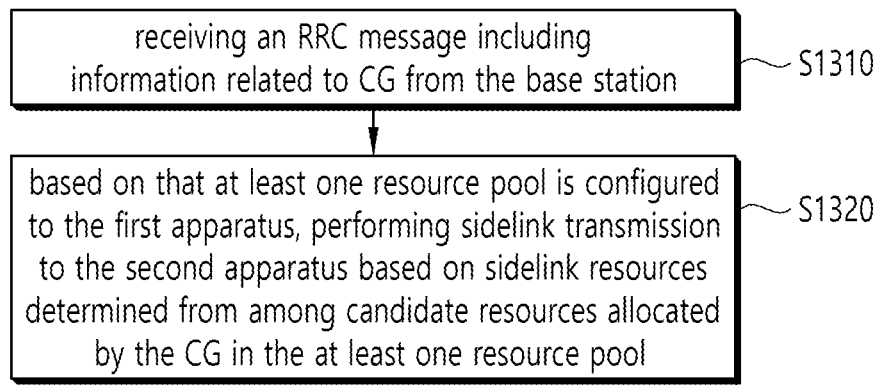
FIG. 13 shows a method for a first apparatus to perform sidelink transmission to a second apparatus based on information related to CG, according to an embodiment of the present disclosure.

FIG. 13 shows a method for a first apparatus to perform sidelink transmission to a second apparatus based on information related to CG, according to an embodiment of the present disclosure. The embodiment of FIG. 13 may be combined with various embodiments of the present disclosure.

Referring to FIG. 13, in step S1310, the first apparatus 100 may receive an RRC message including information related to CG from the base station. For example, the information related to the CG may be information for scheduling a sidelink resource. For example, the information related to the CG may include information for an offset related to the CG and information for a period related to the CG.

In step S1320, based on that at least one resource pool is configured to the first apparatus 100, the first apparatus 100 may perform sidelink transmission to the second apparatus 200 based on sidelink resources determined from among candidate resources allocated by the CG in the at least one resource pool. For example, the sidelink resources determined from among the candidate resources allocated by the CG may be located after the offset related to the CG from the closest sidelink slot after the time when the SFN is 0. For example, the sidelink resources determined from among the candidate resources allocated by the CG may be located after the offset related to the CG from the closest logical sidelink slot after the time when the SFN is 0. For example, the sidelink resources determined from among the candidate resources allocated by the CG may be repeated with the period related to the CG. For example, the period related to the CG and the offset related to the CG may be in unit of logical sidelink slots. For example, the logical sidelink slots may be resources in a sidelink resource pool.

For example, based on the information related to the CG being not including an index for a configured resource pool, the first apparatus 100 may select a resource pool including the closest sidelink slot after the time when the SFN is 0 among the at least one resource pool. Herein, for example, the closest sidelink slot after the time when the SFN is 0 may be a logical sidelink slot. For example, the offset related to the CG may be a unit of logical sidelink slots included in the resource pool. For example, the offset related to the CG may be applied in unit of logical sidelink slots included in the resource pool.

For example, based on the information related to the CG not including an index for a configured resource pool, the first apparatus 100 may select a resource pool having the lowest channel occupancy ratio (CR) among the at least one resource pool.

For example, based on the information related to the CG not including an index for a configured resource pool, the first apparatus 100 may select a resource pool having the lowest channel busy ratio (CBR) among the at least one resource pool.

For example, based on the information related to the CG not including an index for a configured resource pool, the first apparatus 100 may randomly select a resource pool from among the at least one resource pool.

For example, based on the information related to the CG not including an index for a configured resource pool, the first apparatus 100 may select a resource pool having the least interference to other UEs among the at least one resource pool based on a geographical location of the first apparatus 100.

For example, based on the information related to the CG not including an index for a configured resource pool, the first apparatus 100 may select a resource pool in which DL RSRP measured by the first apparatus 100 is within the range related to the DL RSRP among at least one resource pool. For example, the range related to the DL RSRP may be pre-configured by higher layer signaling. Alternatively, for example, the range related to the DL RSRP may be signaled through MAC CE or DCI.

For example, based on the information related to the CG not including an index for a configured resource pool, the transmitting UE may select a resource pool in which SL RSRP measured by the transmitting UE is within the range related to the SL RSRP among at least one resource pool. For example, the range related to the SL RSRP may be pre-configured by higher layer signaling. Alternatively, for example, the range related to the SL RSRP may be signaled through MAC CE or DCI.

For example, based on the information related to the CG not including an index for a configured resource pool, the transmitting UE may determine the closest logical sidelink slot after the time when SFN is 0 among at least one resource pool as a reference time. For example, the transmitting UE may select a resource pool including the closest logical sidelink slot after the offset related to the CG from the reference time. For example, the offset related to the CG may be a unit of logical sidelink slots included in all of the at least one resource pool. For example, the offset related to the CG may be applied in unit of logical sidelink slots included in all of the at least one resource pool.

For example, based on the information related to the CG including an index for a configured resource pool, the sidelink resources determined from among the candidate resources allocated by the CG may be located in the closest logical sidelink slot after the offset related to the CG from the closest logical sidelink slot after the time when SFN=0 among resources in the configured pool. For example, the offset related to the CG may be a unit of logical sidelink slots included in the configured resource pool. For example, the offset related to the CG may be applied in unit of logical sidelink slots included in the configured resource pool.

The proposed method may be applied to an apparatus according to various embodiments of the present disclosure. First, the processor (102) of the first apparatus (100) may control the transceiver (106) to receive a radio resource control (RRC) message including information related to configured grant (CG) from a base station. In addition, the processor (102) of the first apparatus (100) may control the transceiver (106) to transmit, based on at least one resource pool being configured for the first apparatus (100), perform sidelink transmission to a second apparatus (200) based on sidelink resources determined from among candidate resources allocated by the CG in the at least one resource pool.

According to an embodiment of the present disclosure, a first apparatus configured to perform wireless communication may be provided. For example, the first apparatus may comprise: one or more memories storing instructions; one or more transceivers; and one or more processors connected to the one or more memories and the one or more transceivers. For example, the one or more processors may execute the instructions to: receive a radio resource control (RRC) message including information related to configured grant (CG) from a base station, wherein the information related to the CG include information for an offset related to the CG and information for a period related to the CG; based on at least one resource pool being configured for the first apparatus, perform sidelink transmission to a second apparatus based on sidelink resources determined from among candidate resources allocated by the CG in the at least one resource pool. For example, the sidelink resources determined from among the candidate resources allocated by the CG are located after the offset related to the CG from the closest sidelink slot after the time when the system frame number (SFN) is zero. For example, the sidelink resources from among the candidate resources allocated by the CG are repeated with the period related to the CG.

According to an embodiment of the present disclosure, an apparatus configured to control a first user equipment (UE) may be provided. For example, the apparatus may comprise: one or more processors; and one or more memories operably connected to the one or more processors and storing instructions. For example, the one or more processors may execute the instructions to: receive a radio resource control (RRC) message including information related to configured grant (CG) from a base station, wherein the information related to the CG include information for an offset related to the CG and information for a period related to the CG; based on at least one resource pool being configured for the first UE, perform sidelink transmission to a second UE based on sidelink resources determined from among candidate resources allocated by the CG in the at least one resource pool, For example, the sidelink resources determined from among the candidate resources allocated by the CG are located after the offset related to the CG from the closest sidelink slot after the time when the system frame number (SFN) is zero. For example, the sidelink resources from among the candidate resources allocated by the CG are repeated with the period related to the CG.

According to an embodiment of the present disclosure, a non-transitory computer-readable storage medium storing instructions may be provided. For example, the instructions, when executed, cause a first device to: receive, by a first apparatus, a radio resource control (RRC) message including information related to configured grant (CG) from a base station, wherein the information related to the CG include information for an offset related to the CG and information for a period related to the CG; based on at least one resource pool being configured for the first UE, perform, by a first apparatus, sidelink transmission to a second UE based on sidelink resources determined from among candidate resources allocated by the CG in the at least one resource pool. For example, the sidelink resources determined from among the candidate resources allocated by the CG are located after the offset related to the CG from the closest sidelink slot after the time when the system frame number (SFN) is zero. For example, the sidelink resources from among the candidate resources allocated by the CG are repeated with the period related to the CG.

Figure 14:
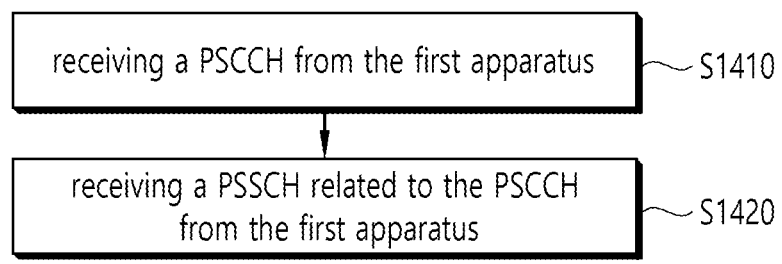
FIG. 14 shows a method for a second apparatus to receive a PSCCH and a PSSCH related to the PSCCH from a first apparatus, according to an embodiment of the present disclosure.

FIG. 14 shows a method for a second apparatus to receive a PSCCH and a PSSCH related to the PSCCH from a first apparatus, according to an embodiment of the present disclosure. The embodiment of FIG. 14 may be combined with various embodiments of the present disclosure.

Referring to FIG. 14, in step S1410, the second apparatus 200 may receive a physical sidelink control channel (PSCCH) from the first apparatus 100. In step S1420, the second apparatus 200 may receive a physical sidelink shared channel (PSSCH) related to the PSCCH from the first apparatus 100.

For example, an RRC message including information related to CG may be received from the base station to the first apparatus 100. For example, the information related to the CG may be information for scheduling a sidelink resource. For example, the information related to the CG may include information for an offset related to the CG and information for a period related to the CG.

For example, based on that at least one resource pool is configured to the first apparatus 100, the PSCCH and the PSSCH related to the PSCCH may be received from the first apparatus 100 to the second apparatus 200 based on sidelink resources determined from among candidate resources allocated by the CG in the at least one resource pool. For example, the sidelink resources determined from among the candidate resources allocated by the CG may be located after the offset related to the CG from the closest sidelink slot after the time when the SFN is 0. For example, the sidelink resources determined from among the candidate resources allocated by the CG may be located after the offset related to the CG from the closest logical sidelink slot after the time when the SFN is 0. For example, the sidelink resources determined from among the candidate resources allocated by the CG may be repeated with the period related to the CG. For example, the period related to the CG and the offset related to the CG may be in unit of logical sidelink slots. For example, the logical sidelink slots may be resources in a sidelink resource pool.

For example, based on the information related to the CG being not including an index for a configured resource pool, from among the at least one resource pool, a resource pool including the closest sidelink slot after the time when the SFN is 0 may be selected. Herein, for example, the closest sidelink slot after the time when the SFN is 0 may be a logical sidelink slot. For example, the offset related to the CG may be a unit of logical sidelink slots included in the resource pool. For example, the offset related to the CG may be applied in unit of logical sidelink slots included in the resource pool.

For example, based on the information related to the CG not including an index for a configured resource pool, a resource pool having the lowest channel occupancy ratio (CR) may be selected from among the at least one resource pool.

For example, based on the information related to the CG not including an index for a configured resource pool, a resource pool having the lowest channel busy ratio (CBR) may be selected from among the at least one resource pool.

For example, based on the information related to the CG not including an index for a configured resource pool, a resource pool may be randomly selected from among the at least one resource pool.

For example, based on the information related to the CG not including an index for a configured resource pool, a resource pool having the least interference to other UEs may be selected from among the at least one resource pool based on a geographical location of the first apparatus 100.

For example, based on the information related to the CG not including an index for a configured resource pool, a resource pool in which DL RSRP measured by the first apparatus 100 is within a range related to the DL RSRP may be selected from among at least one resource pool. For example, the range related to the DL RSRP may be pre-configured by higher layer signaling. Alternatively, for example, the range related to the DL RSRP may be signaled through MAC CE or DCI.

For example, based on the information related to the CG not including an index for a configured resource pool, a resource pool in which SL RSRP measured by the first apparatus 100 is within a range related to the SL RSRP may be selected from among at least one resource pool. For example, the range related to the SL RSRP may be pre-configured by higher layer signaling. Alternatively, for example, the range related to the SL RSRP may be signaled through MAC CE or DCI.

For example, based on the information related to the CG not including an index for a configured resource pool, the closest logical sidelink slot after the time when SFN is 0 may be determined from among at least one resource pool as a reference time. For example, a resource pool including the closest logical sidelink slot after the offset related to the CG from the reference time may be selected. For example, the offset related to the CG may be a unit of logical sidelink slots included in all of the at least one resource pool. For example, the offset related to the CG may be applied in unit of logical sidelink slots included in all of the at least one resource pool.

For example, based on the information related to the CG including an index for a configured resource pool, the sidelink resources determined from among the candidate resources allocated by the CG may be located in the closest logical sidelink slot after the offset related to the CG from the closest logical sidelink slot after the time when SFN=0 among resources in the configured pool. For example, the offset related to the CG may be a unit of logical sidelink slots included in the configured resource pool. For example, the offset related to the CG may be applied in unit of logical sidelink slots included in the configured resource pool.

The proposed method may be applied to an apparatus according to various embodiments of the present disclosure. First, the processor (202) of the second apparatus (200) may control the transceiver (206) to receive a physical sidelink control channel (PSCCH) from a first apparatus (100). In addition, the processor (202) of the first apparatus (200) may control the transceiver (206) to receive a physical sidelink shared channel (PSSCH) related to the PSCCH from the first apparatus (100).

According to an embodiment of the present disclosure, a second apparatus configured to perform wireless communication may be provided. For example, the second apparatus may comprise: one or more memories storing instructions; one or more transceivers; and one or more processors connected to the one or more memories and the one or more transceivers. For example, the one or more processors may execute the instructions to: receive a physical sidelink control channel (PSCCH) from a first apparatus; and receive a physical sidelink shared channel (PSSCH) related to the PSCCH from the first apparatus. For example, a radio resource control (RRC) message including information related to configured grant (CG) is received from base station to the first apparatus. For example, the information related to the CG include information for an offset related to the CG and information for a period related to the CG. For example, based on at least one resource pool being configured for the first apparatus, the PSCCH and the PSSCH are received from the first apparatus to the second apparatus based on sidelink resources determined from among candidate resources allocated by the CG in the at least one resource pool. For example, the sidelink resources determined from among the candidate resources allocated by the CG are located after the offset related to the CG from the closest sidelink slot after the time when the system frame number (SFN) is zero. For example, the sidelink resources from among the candidate resources allocated by the CG are repeated with the period related to the CG.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 15:
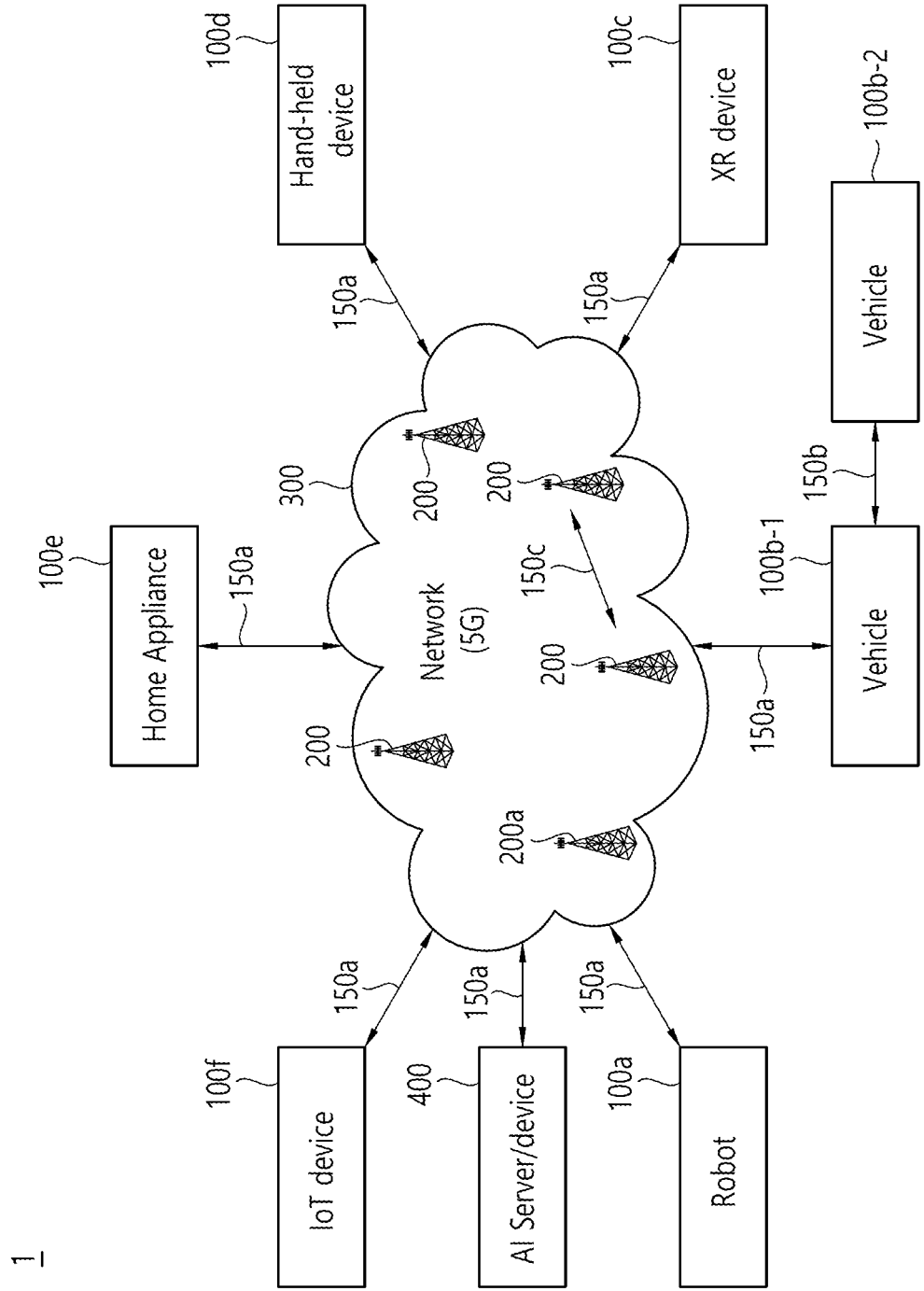
FIG. 15 shows a communication system 1, in accordance with an embodiment of the present disclosure.

FIG. 15 shows a communication system 1, in accordance with an embodiment of the present disclosure.

Referring to FIG. 15, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 16:
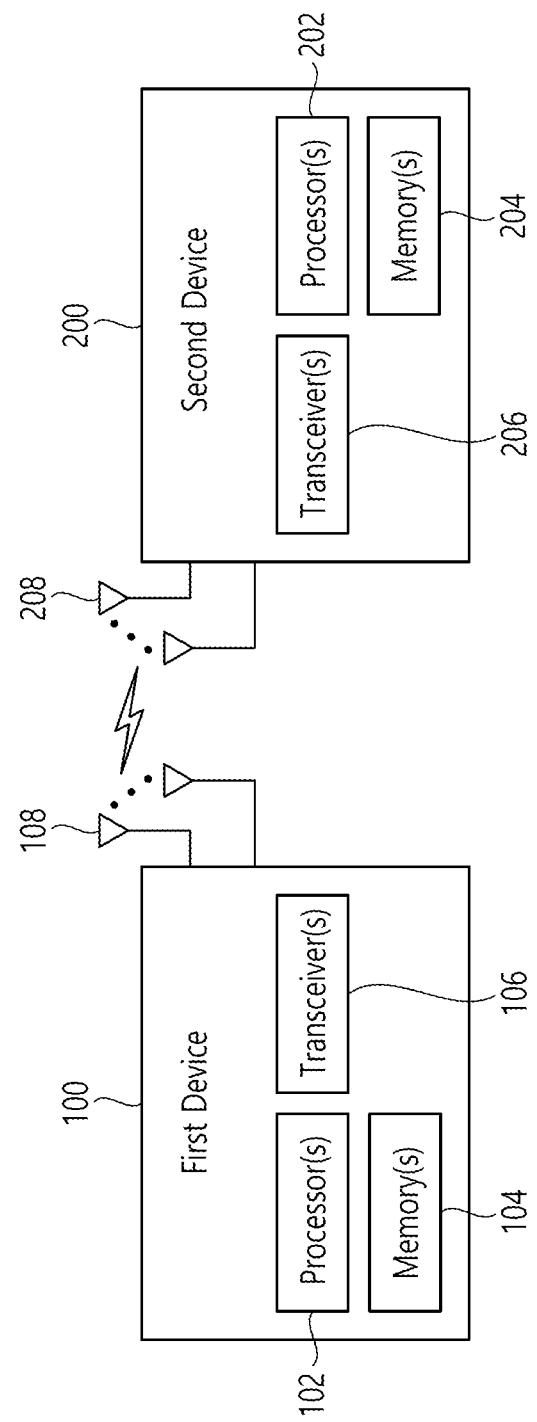
FIG. 16 shows wireless devices, in accordance with an embodiment of the present disclosure.

FIG. 16 shows wireless devices, in accordance with an embodiment of the present disclosure.

Referring to FIG. 16, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 15.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 17:
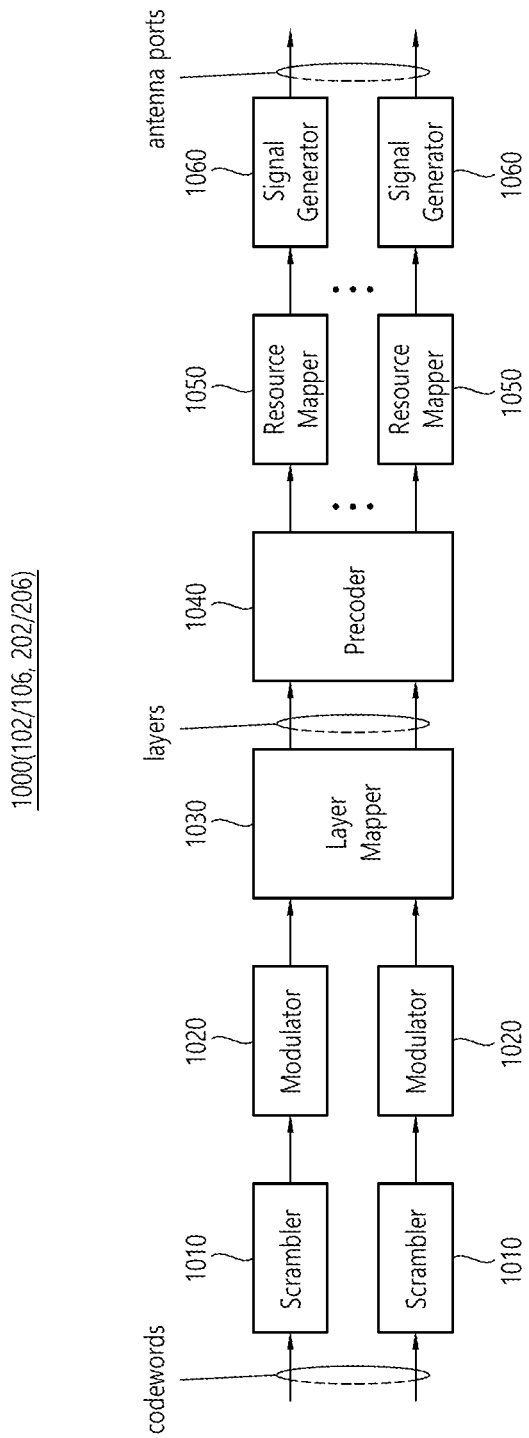
FIG. 17 shows a signal process circuit for a transmission signal, in accordance with an embodiment of the present disclosure.

FIG. 17 shows a signal process circuit for a transmission signal, in accordance with an embodiment of the present disclosure.

Referring to FIG. 17, a signal processing circuit 1000 may include scramblers 1010, modulators 1020, a layer mapper 1030, a precoder 1040, resource mappers 1050, and signal generators 1060. An operation/function of FIG. 17 may be performed, without being limited to, the processors 102 and 202 and/or the transceivers 106 and 206 of FIG. 16. Hardware elements of FIG. 17 may be implemented by the processors 102 and 202 and/or the transceivers 106 and 206 of FIG. 16. For example, blocks 1010 to 1060 may be implemented by the processors 102 and 202 of FIG. 16. Alternatively, the blocks 1010 to 1050 may be implemented by the processors 102 and 202 of FIG. 16 and the block 1060 may be implemented by the transceivers 106 and 206 of FIG. 16.

Codewords may be converted into radio signals via the signal processing circuit 1000 of FIG. 17. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 17. For example, the wireless devices (e.g., 100 and 200 of FIG. 16) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 18:
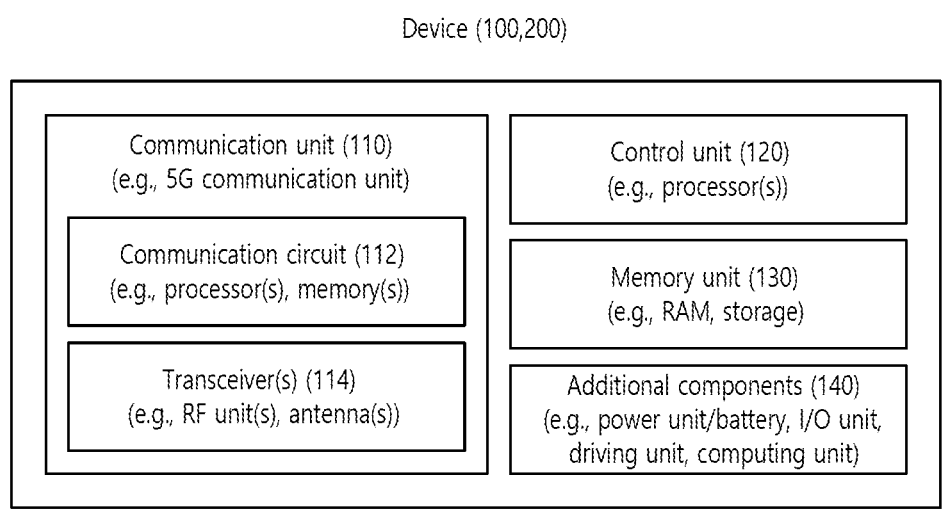
FIG. 18 shows another example of a wireless device, in accordance with an embodiment of the present disclosure.

FIG. 18 shows another example of a wireless device, in accordance with an embodiment of the present disclosure. The wireless device may be implemented in various forms according to a use-case/service (refer to FIG. 15).

Referring to FIG. 18, wireless devices 100 and 200 may correspond to the wireless devices 100 and 200 of FIG. 16 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 16. For example, the transceiver(s) 114 may include the one or more transceivers 106 and 206 and/or the one or more antennas 108 and 208 of FIG. 16. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 15), the vehicles (100b-1 and 100b-2 of FIG. 15), the XR device (100c of FIG. 15), the hand-held device (100d of FIG. 15), the home appliance (100e of FIG. 15), the IoT device (100f of FIG. 15), a digital broadcast terminal, a hologram device, a public safety device, an MTC device, a medicine device, a fintech device (or a finance device), a security device, a climate/environment device, the AI server/device (400 of FIG. 15), the BSs (200 of FIG. 15), a network node, etc. The wireless device may be used in a mobile or fixed place according to a use-example/service.

In FIG. 18, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 18 will be described in detail with reference to the drawings.

Figure 19:
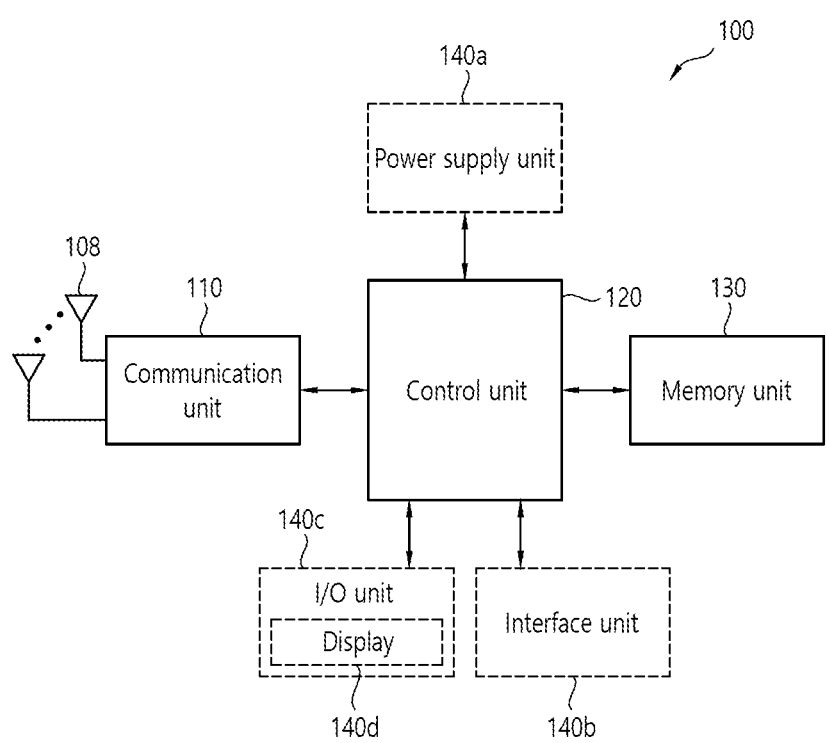
FIG. 19 shows a hand-held device, in accordance with an embodiment of the present disclosure.

FIG. 19 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 19, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 18, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 20:
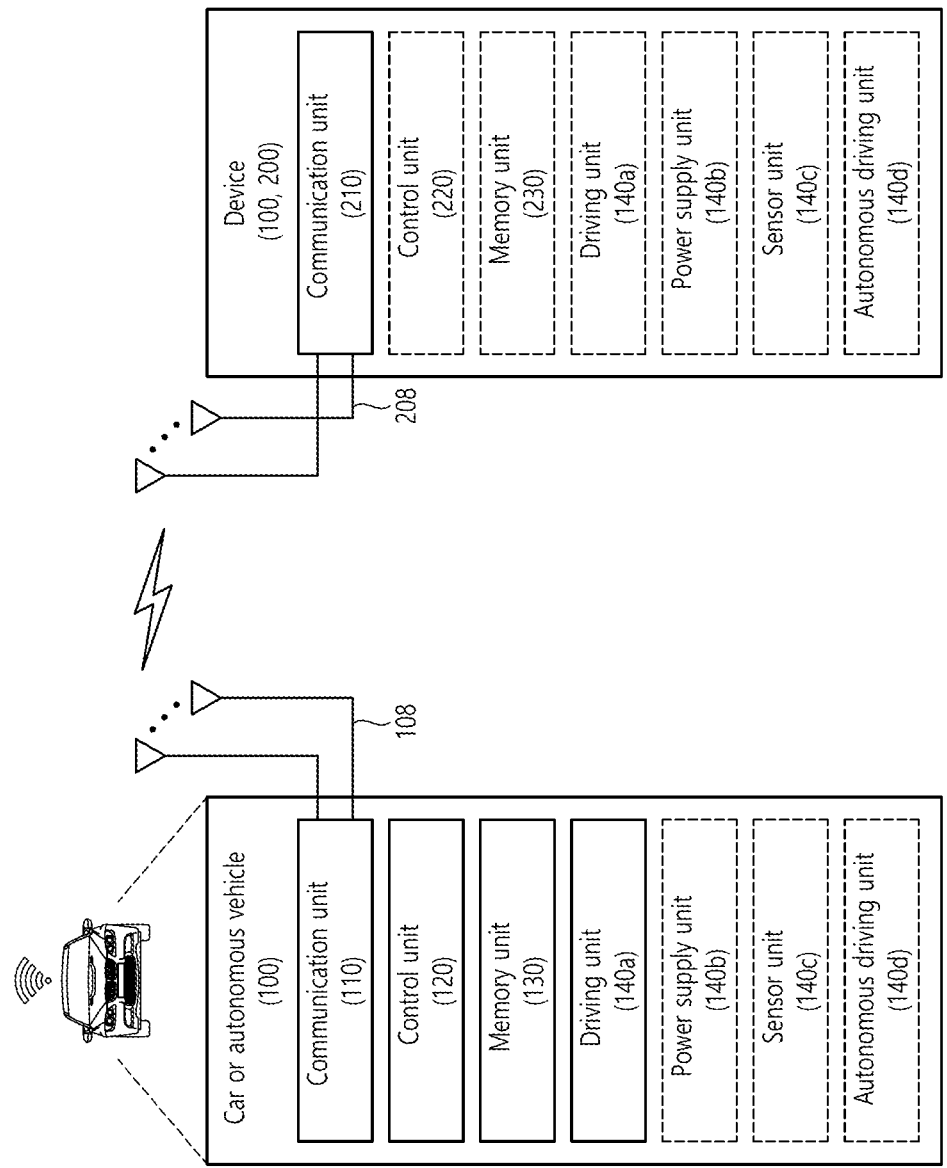
FIG. 20 shows a vehicle or an autonomous vehicle, in accordance with an embodiment of the present disclosure.

FIG. 20 shows a vehicle or an autonomous vehicle, in accordance with an embodiment of the present disclosure. The vehicle or autonomous vehicle may be implemented by a mobile robot, a car, a train, a manned/unmanned Aerial Vehicle (AV), a ship, etc.

Referring to FIG. 20, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 18, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing wireless communication by a first apparatus, the method comprising:
   receiving, from a base station, a radio resource control (RRC) message including information related to configured grant (CG),
   wherein the information related to the CG include information regarding a slot offset related to the CG and information regarding a period related to the CG;
   determining, by the first apparatus, a reference logical slot as a 1st logical slot of a resource pool after a starting time of a reference system frame number (SFN),
   wherein the reference SFN is a zero SFN,
   performing sidelink transmission to a second apparatus based on sidelink resources determined from among candidate resources allocated by the CG in the resource pool,
   wherein the sidelink resources are located (i) in logical slots of a resource pool, and (ii) after the slot offset with respect to the reference logical slot,
   wherein the slot offset related to the CG is in a unit of a number of logical slots in the resource pool, and
   wherein the sidelink resources from among the candidate resources allocated by the CG are repeated with the period related to the CG.

2. The method of claim 1, further comprising:
   based on the information related to the CG not including an index for a configured resource pool, selecting a resource pool including the 1st logical slot after the time when the SFN is zero.

3. The method of claim 1, further comprising:
   based on the information related to the CG not including an index for a configured resource pool, selecting a resource pool including having the lowest channel occupancy ratio (CR).

4. The method of claim 1, further comprising:
   based on the information related to the CG not including an index for a configured resource pool, selecting a resource pool including having the lowest channel busy ratio (CBR).

5. The method of claim 1, further comprising:
   based on the information related to the CG not including an index for a configured resource pool, selecting a resource pool randomly.

6. The method of claim 1, further comprising:
   based on the information related to the CG not including an index for a configured resource pool, selecting a resource pool having the least interference to other apparatuses based on a geographical location of the first apparatus.

7. The method of claim 1, further comprising:
   based on the information related to the CG not including an index for a configured resource pool, selecting a resource pool in which downlink reference signal received power (DL RSRP) measured by the first apparatus is within a range related to the DL RSRP.

8. The method of claim 7, wherein the range related to the DL RSRP is pre-configured by higher layer signaling.

9. The method of claim 1, further comprising:
   based on the information related to the CG not including an index for a configured resource pool, selecting a resource pool in which sidelink reference signal received power (SL RSRP) measured by the first apparatus is within a range related to the SL RSRP.

10. The method of claim 9, wherein the range related to the SL RSRP is signaled through MAC control element (CE) or downlink control information (DCI).

11. The method of claim 1, further comprising:
    based on the information related to the CG not including an index for a configured resource pool, determining the 1st logical slot after the time when SFN is zero as a reference time,
    wherein the 1st logical slot is a logical sidelink slot; and
    selecting a resource pool including the 1st logical slot after the slot offset related to the CG from the reference time,
    wherein the slot offset related to the CG is a unit of logical sidelink slots.

12. The method of claim 1, wherein, based on the information related to the CG including an index for a configured resource pool, the sidelink resources determined from among the candidate resources allocated by the CG are located in the 1st logical slot after the slot offset related to the CG, and
    wherein the slot offset related to the CG is applied from the 1st logical slot after the time when the SFN is zero among resources in the configured resource pool.

13. The method of claim 1, further comprising:
    obtaining information regarding a timing offset for determining a timing of a transmission of the first apparatus; and
    wherein the sidelink transmission to the second apparatus is performed based on (i) the timing offset and (ii) the sidelink resources.

14. A first apparatus for performing wireless communication, the first apparatus comprising:
    one or more memories storing instructions;
    one or more transceivers; and
    one or more processors connected to the one or more memories and the one or more transceivers, wherein the one or more processors execute the instructions to:

receive, from a base station, a radio resource control (RRC) message including information related to configured grant (CG),
  wherein the information related to the CG include information regarding a slot offset related to the CG and information regarding a period related to the CG;
determine a reference logical slot as a 1st logical slot of a resource pool after a starting time of a reference system frame number (SFN),
  wherein the reference SFN is a zero SFN,
perform sidelink transmission to a second apparatus based on sidelink resources determined from among candidate resources allocated by the CG in the resource pool,
  wherein the sidelink resources are located (i) in logical slots of a resource pool, and (ii) after the slot offset with respect to the reference logical slot,
  wherein the slot offset related to the CG is in a unit of a number of logical slots in the resource pool, and
  wherein the sidelink resources from among the candidate resources allocated by the CG are repeated with the period related to the CG.

15. The first apparatus of claim 14, the one or more processors further execute the instructions to:
  obtain information regarding a timing offset for determining a timing of a transmission of the first apparatus; and
  wherein the sidelink transmission to the second apparatus is performed based on (i) the timing offset and (ii) the sidelink resources.

16. An processing device adapted to control a first apparatus, the processing device comprising:
  one or more processors; and
  one or more memories operably connectable to the one or more processors and storing instructions, wherein the one or more processors execute the instructions to:
  receive, from a base station, a radio resource control (RRC) message including information related to configured grant (CG),
    wherein the information related to the CG include information regarding a slot offset related to the CG and information regarding a period related to the CG;
  determine a reference logical slot as a 1st logical slot of a resource pool after a starting time of a reference system frame number (SFN),
    wherein the reference SFN is a zero SFN,
  perform sidelink transmission to a second apparatus based on sidelink resources determined from among candidate resources allocated by the CG in the resource pool,
    wherein the sidelink resources are located (i) in logical slots of a resource pool, and (ii) after the slot offset with respect to the reference logical slot,
    wherein the slot offset related to the CG is in a unit of a number of logical slots in the resource pool, and
    wherein the sidelink resources from among the candidate resources allocated by the CG are repeated with the period related to the CG.

17. The processing device of claim 16, the one or more processors further execute the instructions to:
  obtain information regarding a timing offset for determining a timing of a transmission of the first device; and
  wherein the sidelink transmission to the second apparatus is performed based on (i) the timing offset and (ii) the sidelink resources.

* * * * *